US008897133B2

(12) United States Patent
Lin (10) Patent No.: US 8,897,133 B2
(45) Date of Patent: Nov. 25, 2014

(54) MULTI-STAGE SWITCH FABRIC

(75) Inventor: Yun Lin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 788 days.

(21) Appl. No.: 12/836,171

(22) Filed: Jul. 14, 2010

(65) Prior Publication Data

US 2011/0032934 A1 Feb. 10, 2011

(30) Foreign Application Priority Data

Aug. 4, 2009 (CN) .......................... 2009 1 0161566

(51) Int. Cl.

| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/50 | (2006.01) |
| H04Q 11/00 | (2006.01) |
| H04L 12/28 | (2006.01) |
| H04J 14/00 | (2006.01) |
| H03K 17/00 | (2006.01) |
| H04Q 3/00 | (2006.01) |
| H04L 12/931 | (2013.01) |
| H04L 12/935 | (2013.01) |
| H04L 12/933 | (2013.01) |

(52) U.S. Cl.
CPC ............. *H04L 49/45* (2013.01); *H04L 49/3018* (2013.01); *H04L 49/3027* (2013.01); *H04L 49/3072* (2013.01); *H04L 49/1515* (2013.01)
USPC .......... 370/235; 370/388; 370/395.2; 398/50; 340/2.21; 340/2.28

(58) Field of Classification Search
USPC ......... 370/235, 388, 395.2; 398/50; 340/2.21, 340/2.28
See application file for complete search history.

(56) References Cited

U.S. PATENT DOCUMENTS 6,993,032 B1 * 1/2006 Dammann et al. ......... 370/395.7
7,552,262 B1 * 6/2009 Turner et al. .................. 710/302

(Continued)

FOREIGN PATENT DOCUMENTS

| CN | 1848803 A | 10/2006 |
| CN | 101179453 A | 5/2008 |
| CN | 101459598 A | 6/2009 |

OTHER PUBLICATIONS

European Search Report dated Oct. 28, 2010 in connection with European Patent Application No. 10 16 9475.

(Continued)

*Primary Examiner* — Alpus H Hsu
*Assistant Examiner* — Yee Lam (57) ABSTRACT

A multi-stage switch fabric (SF) is provided. The multi-stage SF includes a line card chassis (LCC) and a fabric card chassis (FCC). The FCC includes a stage-1 switch element (S1), a stage-2 switch element (S2), and a stage-3 switch element (S3), where the S3 corresponds to the S1, and the S2 is coupled to the S1 and S3 respectively. The LCC includes an interface component and a line card (LC) coupled to the interface component, where the interface component is coupled to the S1 and S3 in the FCC respectively. Through the technical solution under the present invention, when a switch element generates flow control information and requires another switch element or an LC to respond to the flow control information, a timely response can be received.

5 Claims, 11 Drawing Sheets

(56) References Cited

U.S. PATENT DOCUMENTS

| | | | |
|---|---|---|---|
| 8,050,559 B2 * | 11/2011 | Sindhu | 398/49 |
| 8,687,629 B1 * | 4/2014 | Kompella et al. | 370/388 |
| 2008/0267182 A1 * | 10/2008 | Smiljanic | 370/390 |
| 2010/0061241 A1 * | 3/2010 | Sindhu et al. | 370/235 |
| 2010/0061367 A1 * | 3/2010 | Sindhu et al. | 370/389 |
| 2010/0061394 A1 * | 3/2010 | Sindhu et al. | 370/422 |

OTHER PUBLICATIONS

Communication pursuant to Article 94(3) EPC dated Oct. 16, 2012 in connection with European Patent Application No. 10 169 475.0.

* cited by examiner

FIG. 1

<Prior Art>

FIG. 2

<Prior Art>

<Prior Art>

MULTI-STAGE SWITCH FABRIC

CROSS-REFERENCE TO RELATED APPLICATION

This application claims priority to Chinese Patent Application No. 200910161566.1, filed on Aug. 4, 2009, which is hereby incorporated by reference in its entirety.

TECHNICAL FIELD

The present invention relates to communication technologies, and in particular, to a multi-stage switch fabric (SF).

BACKGROUND

Figure 1:
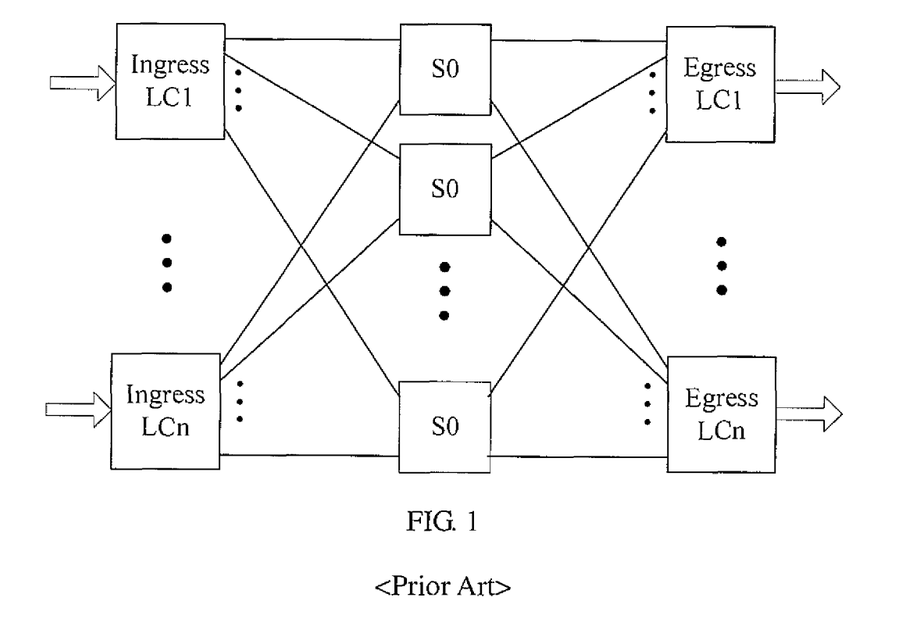
FIG. 1 shows a structure of an SF in the prior art.
Figure 2:
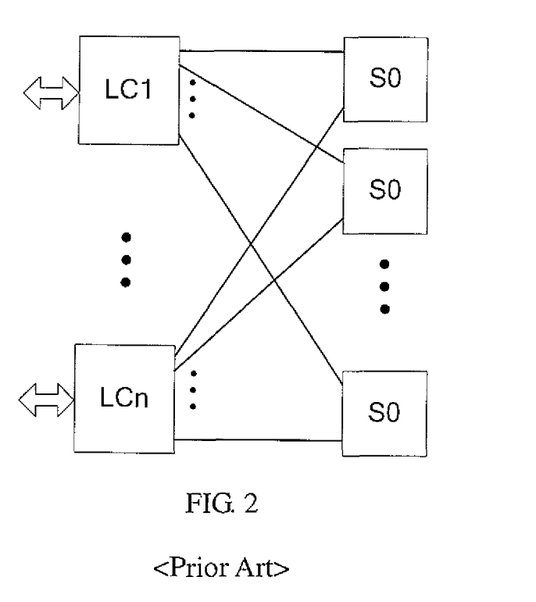
FIG. 2 shows a structure of another SF in the prior art.
Figure 3:
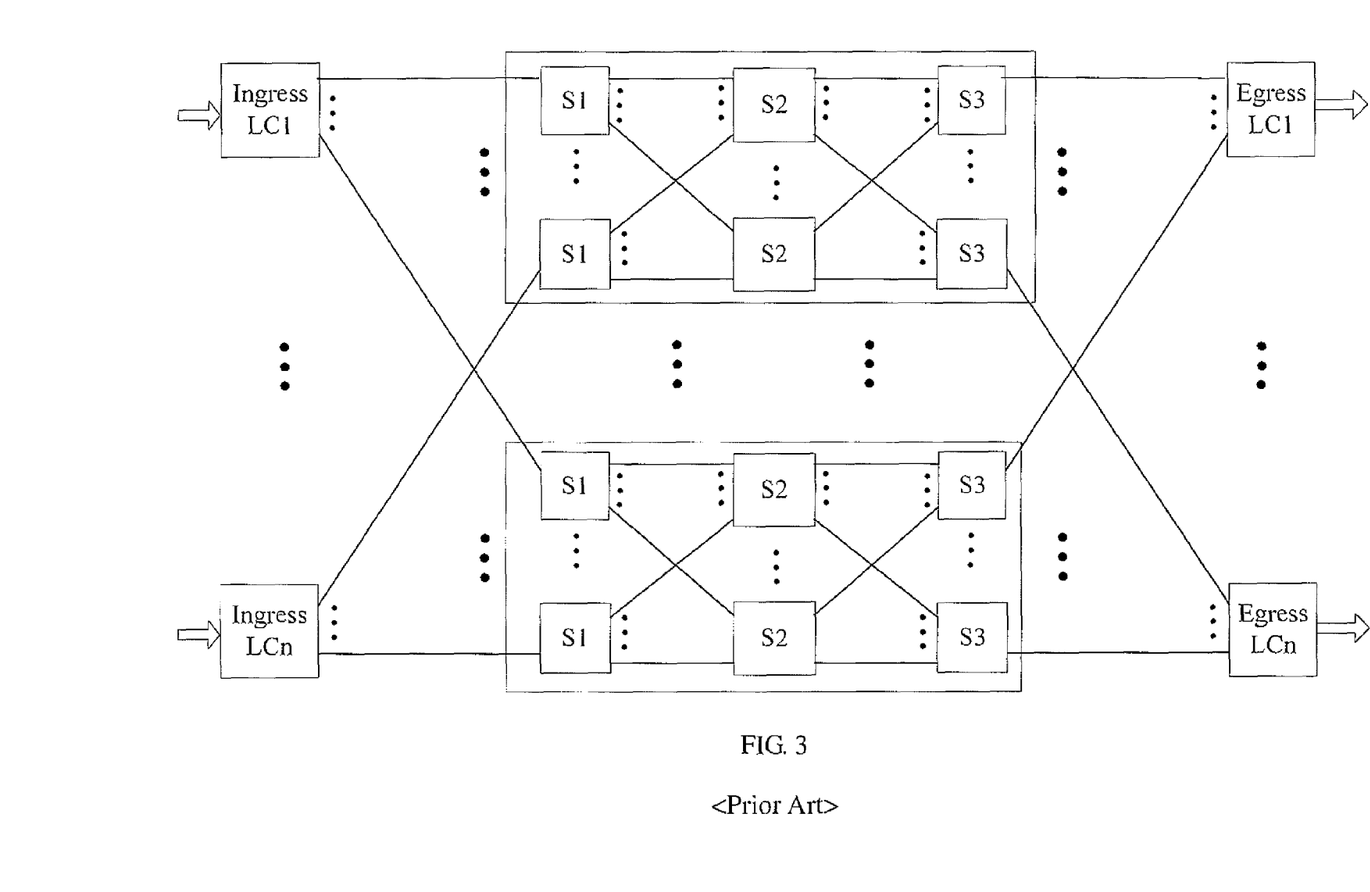
FIG. 3 shows a structure of another SF in the prior art.
Figure 4:
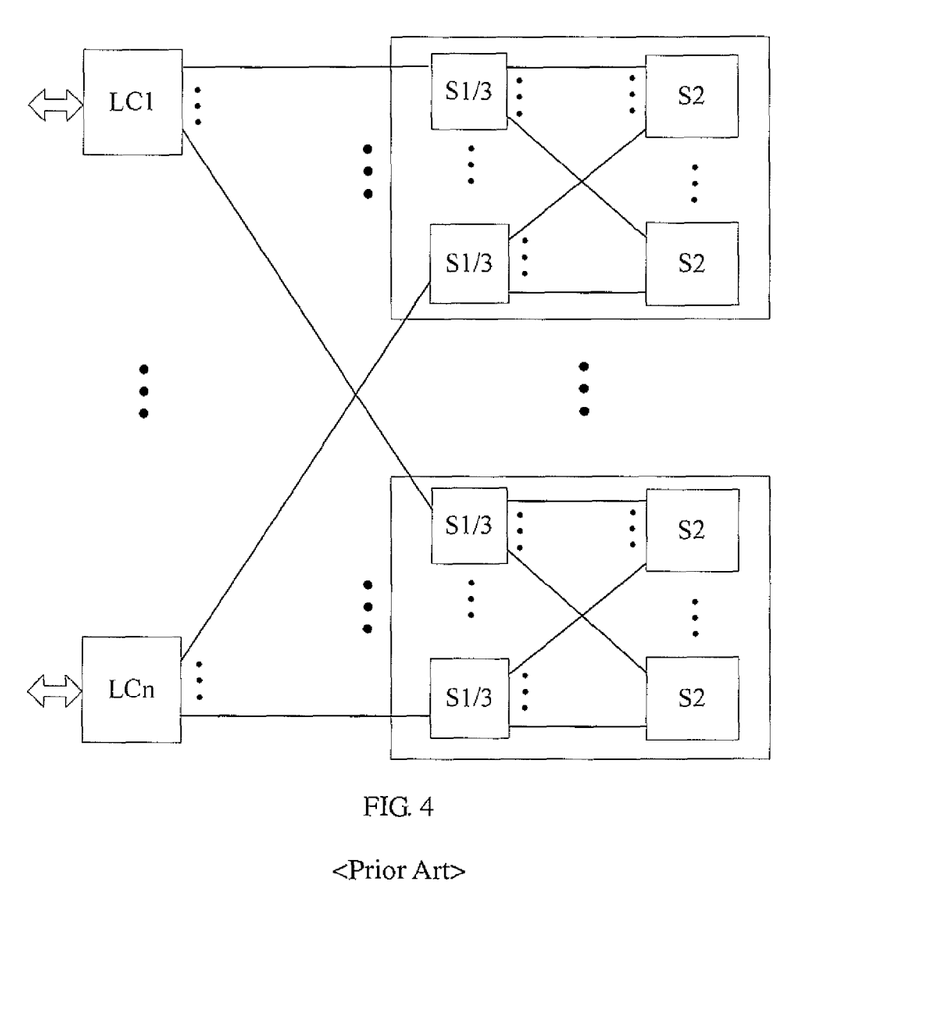
FIG. 4 shows a structure of another SF in the prior art.

An SF may include one or more stages of switch elements, as shown in FIG. 1, FIG. 2, FIG. 3, and FIG. 4. The SF shown in FIG. 1 and FIG. 2 includes a stage-0 switch element (S0) and multiple line cards (LCs). The SF shown in FIG. 3 and FIG. 4 includes three stages of switch elements and multiple LCs. In FIG. 1 and FIG. 3, the LC that sends uplink data flows (ingress LC) is located on one side of the switch element, and the LC that receives downlink data flows (egress LC) is located on the other side of the switch element. The LC in FIG. 2 and FIG. 4 can send uplink data flows and receive downlink data flows. In FIG. 4, the S1/3 includes two parts: a stage-1 switch element (S1), and a stage-3 switch element (S3). The packets sent by a source LC carry destination LC information. The packets pass through the S1, a stage-2 switch element (S2), and S3, and arrive at the destination LC. The packets include variable-length packets and fixed-length cells.

Figure 5:
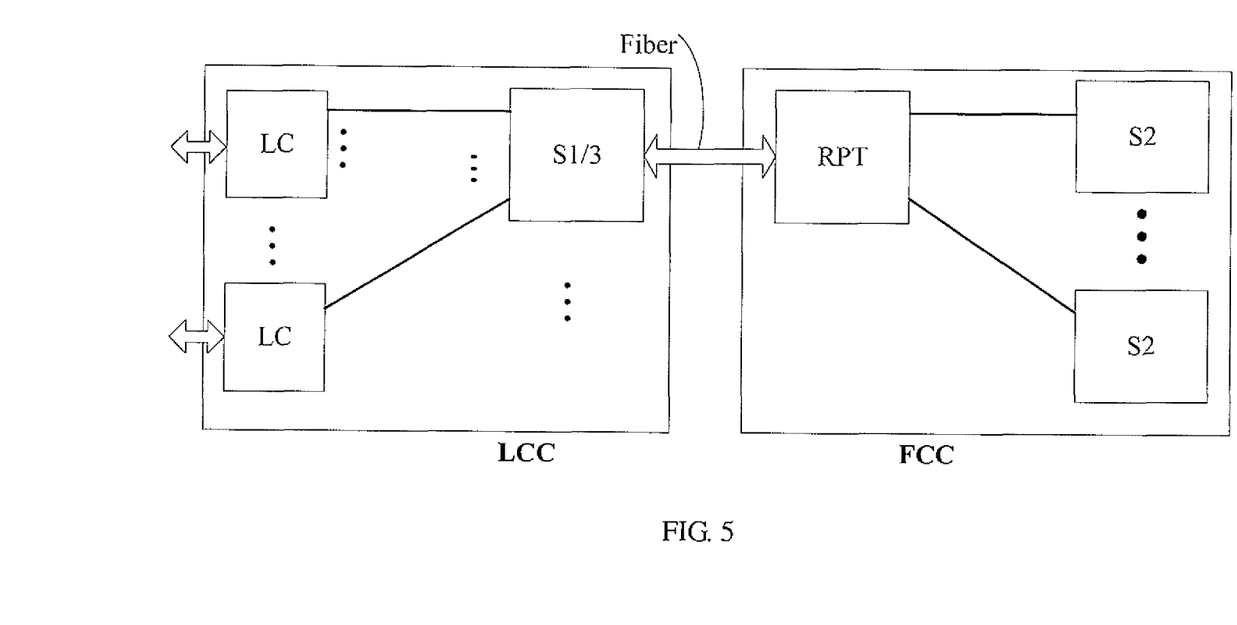
FIG. 5 shows a structure of a multi-stage SF in the prior art.

In a common multi-stage SF, both the LC and the S1/3 are generally located in a line card chassis (LCC). The S1/3 includes two parts: the S1, and the S3, where the S1 corresponds to the S3. In this case, the S1 and S3 may be located on the same physical component or on different physical components. The 81 may be coupled to the S3 through a specific interface; the S2 is generally located in a fabric card chassis (FCC), and the FCC is coupled to the LCC through fibers or cables, as shown in FIG. 5. According to a specific algorithm such as a load balancing algorithm, the S1 in the LCC selects an S2, and forwards the packets sent by the source LC to the FCC through fibers, and a repeater (RPT) in the FCC forwards the packets to the S2. The S2 switches the packets to the S3 in the LCC according to the destination LCC information carried in the packets. Finally, the S3 in the destination LCC switches the packets to the destination LC according to the destination LC information carried in the packets. The FCC may have no RPT.

The defects of the prior art are as follows:

In a multi-stage SF provided in the prior art, flow control information is not responded to in time. For example, when congestion occurs at the S3, and the S3 wants to notify its upstream switch element (such as the S2) to suspend the sending of packets, the physical path of flow control information fed back by the S3 to the S2 is as follows: The S3 transmits the flow control information to the S1 which is corresponding to the S3, and the S1 sends the flow control information to the S2. When congestion occurs at the S2, the physical path of flow control information fed back by the S2 to the upstream switch element (such as the S1) is as follows: The S2 transmits the flow control information to the S3, and the S3 sends the flow control information to the S1. Therefore, the flow control information fed back by a downstream switch element to an upstream switch element needs to pass through fibers between the FCC and the LCC, the transmission of flow control information in the fibers incurs a great delay, and the fed back flow control information is not responded to in time.

SUMMARY

Embodiments of the present invention provide an SF and an FCC, through which the flow control information fed back by a downstream switch element to an upstream switch element is responded to in time in a multi-stage SF.

A multi-stage SF provided in an embodiment of the present invention includes:

an FCC, which includes an S1, an S2, and an S3, where the S3 corresponds to the S1, and the S2 is coupled to the S1 and S3 respectively; and an LCC, which includes an interface component and an LC coupled to the interface component, where the interface component is coupled to the S1 and S3 in the FCC respectively.

A multi-stage SF provided in another embodiment of the present invention includes:

an FCC, which includes an S1, an S2, and an S3, where the S3 corresponds to the S1, and the S2 is coupled to the S1 and S3 respectively; and an LCC, which includes an LC coupled to the S1 and S3 in the FCC respectively.

The FCC in the SF includes: an S1, an S2, and an S3, where the S3 corresponds to the S1, and the S2 is coupled to the S1 and S3 respectively. The S1, S2, and S3 are located in the FCC. Therefore, when a switch element generates flow control information and requires another switch element or an LC to respond to the flow control information, a timely response can be received.

BRIEF DESCRIPTION OF THE DRAWINGS

In order to make the technical solution under the present invention clearer, the accompanying drawings for illustrating the embodiments of the present invention or the prior art are outlined below. Evidently, the accompanying drawings are for the exemplary purpose only, and those skilled in the art can derive other drawings from such accompanying drawings without any creative effort.

DETAILED DESCRIPTION

First Embodiment

Figure 6:
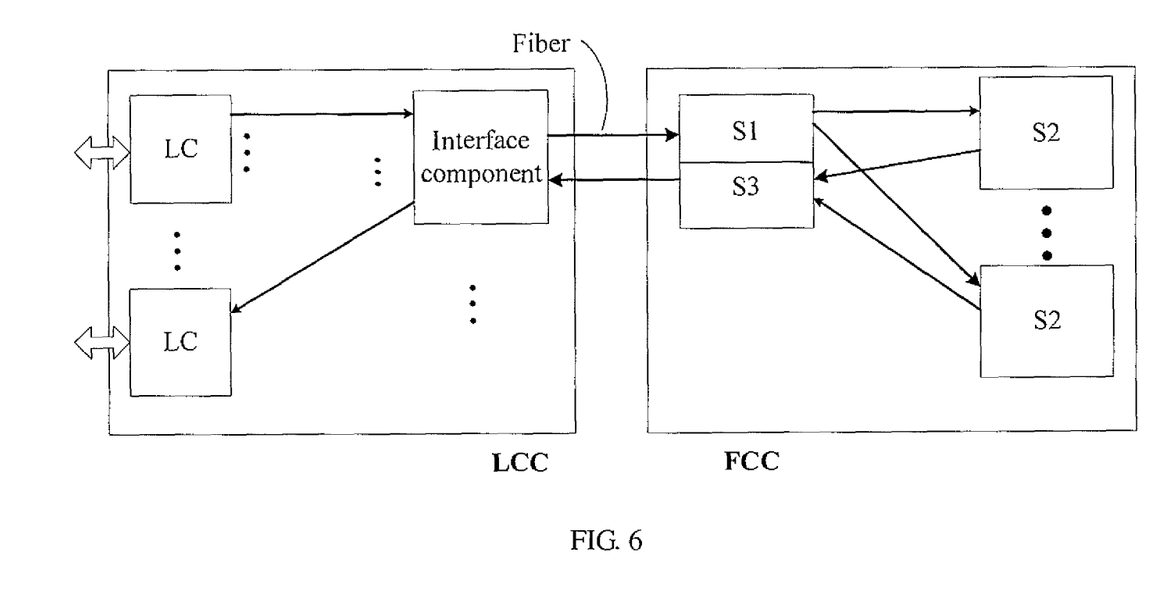
FIG. 6 shows a structure of a multi-stage SF according to a first embodiment of the present invention.

As shown in FIG. 6, a multi-stage SF is provided in the first embodiment of the present invention. The multi-stage SF includes at least one FCC, and one or more LCCs.

The FCC includes an S1, an S2, and an S3, where the S3 corresponds to the S1, and the S2 is coupled to the S1 and S3 respectively.

The LCC includes an interface component and an LC coupled to the interface component, where the interface component is coupled to the S1 and S3 in the FCC respectively.

The interface component may be an S0 or an RPT. If the interface component is an S0, packets may be switched within the same LCC.

The FCC in the SF provided in the first embodiment includes: an S1, an S2, and an S3, where the S3 corresponds to the S1, and the S2 is coupled to the S1 and S3 respectively. The S1, S2, and S3 are located in the FCC. Therefore, when a switch element generates flow control information and requires another switch element or an LC to respond to the flow control information, a timely response can be received.

Second Embodiment

Figure 7:
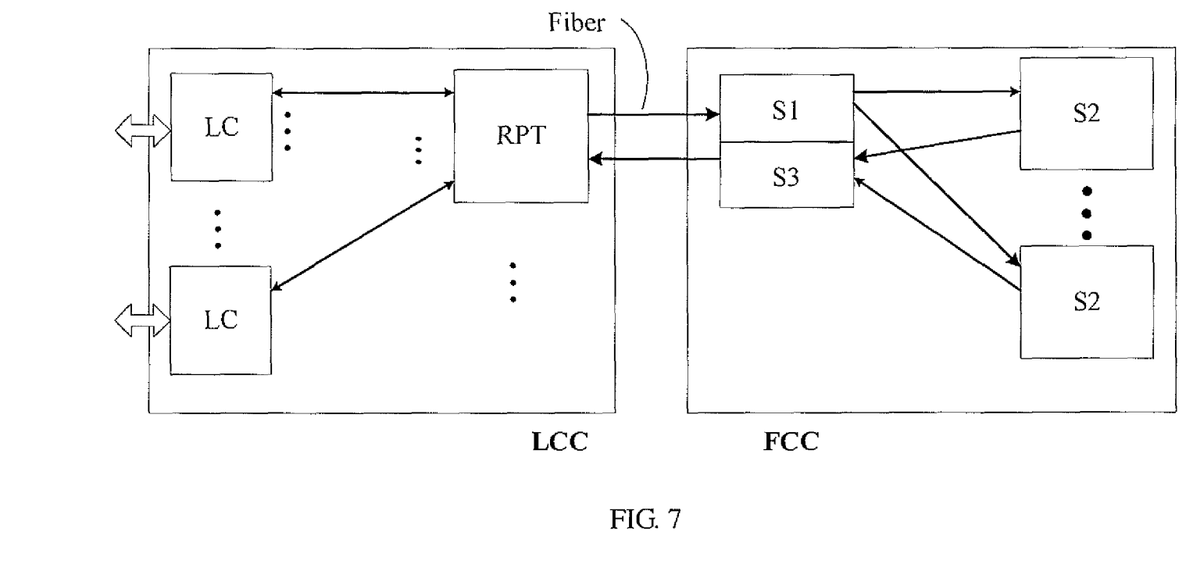
FIG. 7 shows a structure of a multi-stage SF according to a second embodiment of the present invention.

As shown in FIG. 7, a multi-stage SF is provided in the second embodiment of the present invention. The multi-stage SF includes at least one FCC, and one or more LCCs.

The LCC includes an LC and an RPT.

The FCC includes: an S1, an S2, and an S3, where the S3 corresponds to the S1, the S2 is coupled to the S1 and S3 respectively, and the S1 and S3 can be coupled to the S2 through an electrical backplane or a fiber in the FCC.

Through this SF, the packets may be switched between different LCs. The packet format is shown in Table 1:

| Destination LCC ID | Destination LC ID | Fragment# | Payload |
|---|---|---|---|

Fragment # means that the packet is a fragment of a large packet.

Specifically, the process of packet switching between different LCs includes the following steps: The RPT receives a packet sent by the source LC, and sends the packet to the S1 in the FCC through a fiber; according to a certain algorithm such as a load balancing algorithm, the S1 selects an S2, and sends the packet to the S2; according to the destination LCC ID, the S2 selects the S3 coupled to the destination LCC, and sends the packet to the S3; according to the destination LC ID in the packet, the S3 sends the packet through a fiber to the RPT in the LCC, and the RPT forwards the packet to the destination LC. It should be noted that the RPT in this embodiment is only a transmission component, and does not perform operations such as packet switching. Therefore, similar to the LCC in the fourth embodiment, the LCC in this embodiment may have no RPT.

Through this SF, the flow control information generated by the S3 may be quickly transmitted to the component required to respond to the flow control information. The component that responds to the flow control information may be the S2 or S1 or LC. The following description supposes that the S2 is the component that responds to the flow control information: When congestion occurs at the S3, and the S3 wants to notify the S2 to suspend the sending of packets, the S3 generates flow control information that includes an ID of the S2 required by the S3 to respond to the flow control information (the ID may be an ID of one or more S2s); the S3 sends the flow control information to the S1 corresponding to the S3. It should be noted that the S3 and the corresponding S1 may be located in the same physical component or different physical components, and may be connected through a dedicated interface. According to the S2 ID carried in the flow control information, the S1 sends the flow control information to the S2. After receiving the flow control information, the S2 knows that congestion occurs at the S3 and suspends the sending of packets to the S3. The flow control information needs to be transmitted only in this FCC, and does not need to be transmitted to the LCC through fibers as in the prior art. Therefore, the flow control information generated by the S3 can be transmitted to the S2 in time, and the S2 can respond to the flow control information in time.

In the following description, the LC is a component that responds to the flow control information sent by the S3: When congestion occurs at the S3, and the S3 wants to notify the LC to suspend the sending of packets, the S3 generates flow control information. The flow control information includes: an ID of the component required by the S3 to respond to the flow control information (namely, the ID of the LC) and the ID of the LCC that includes the LC; the S3 sends the flow control information to the S1 corresponding to the S3; according to an algorithm such as a load balancing algorithm, the S1 selects one or more S2s, and sends the flow control information to the S2; according to the ID of the LCC, the S2 determines the S3 coupled to the LCC, and sends the flow control information to the S3; according to the ID of the LC, the S3 sends the flow control information to the LC through the RPT. In the transmission process of the flow control information, the flow control information passes through the fibers between the LCC and the FCC only once. In contrast, in the prior art, the flow control information passes through the fibers between the LCC and the FCC twice. Therefore, in the solution disclosed herein, the flow control information generated by the S3 can be transmitted to the LC in time.

The flow control information generated by the S2 can be quickly transmitted to the component that responds to the flow control information, for example, transmitted to the S1 or the LC. The following description supposes that the component that responds to the flow control information is the S1: When congestion occurs at the S2, and the S2 wants to notify the S1 to suspend the sending of packets, the S2 generates flow control information, and the flow control information includes an ID of the component required to respond to the flow control information (namely, the ID of the S1); the S2 sends the flow control information to the S3 corresponding to the S1; the S3 sends the flow control information to the S1 according to the ID of the S1 in the flow control information; after receiving the flow control information, the S1 knows the congestion at the S2, and suspends the sending of packets to the S2. The flow control information needs to be transmitted only in this FCC, and does not need to be transmitted to the LCC through fibers as in the prior art. Therefore, the flow control information generated by the S2 can be transmitted to the S1 in time, and the S1 can respond to the flow control information in time.

It should be noted that the mapping relations between components that generate and respond to the flow control information are not limited to the correspondence shown in the three scenarios above. Other modes of generating and responding to the flow control information are also applicable to the technical solution provided herein.

In the SF provided in the second embodiment, the S1, S2, and S3 are all located in the FCC. The RPT in the LCC serves the purpose of only transmitting data or information, and therefore, the flow control information generated by the S3 can be transmitted to the S2 in time, the flow control information generated by the S2 can be transmitted to the S1 in time, and the flow control information can be responded to in time.

Third Embodiment

Figure 8:
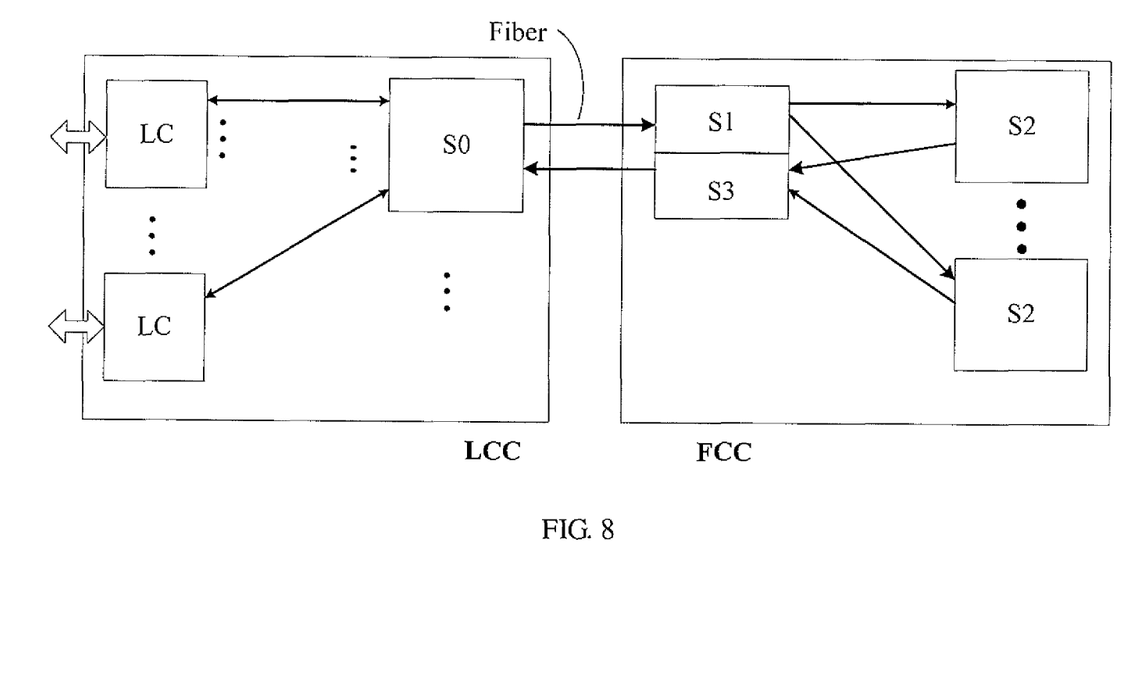
FIG. 8 shows a structure of a multi-stage SF according to a third embodiment of the present invention.

As shown in FIG. 8, a multi-stage SF is provided in the third embodiment of the present invention. The multi-stage SF includes at least one FCC, and one or more LCCs.

The LCC includes an LC and an S0. The FCC includes: an S1, an S2, and an S3, where the S3 corresponds to the S1, the S2 is coupled to the S1 and S3 respectively, and the S1 and S3 can be connected to the S2 through an electrical backplane or a fiber in the FCC. FIG. 8 shows a one-to-one mapping relation between the S0 and the S1/3 ("S1/3" indicates that the S1 corresponds to the S3). In fact, a many-to-many mapping relation exists between the S0 and the S1/3. In the following description, the mapping relation is a one-to-one relation.

To make the embodiments of the present invention clearer, the following describes a single-stage SF briefly first. In a single-stage SF, the LC and S0 are located in an LCC, and can be interconnected through an electrical backplane or a fiber in the LCC. The S0 is configured to forward packets from one LC to another in the LCC. The LCC in an SF provided in this embodiment may be an LCC in a single-stage SF. The configuration of switch elements in the LCC is still the configuration of the S0. In the process of system expansion which couples the LCC to the FCC, it is not necessary to change the S0 to the S1/3. Therefore, it is not necessary to change the configuration of the LCC in operation (or change the switch elements); instead, the existing LCC is connected to the FCC directly to work, and the traffic in the existing LCC keeps uninterrupted.

Through this SF, the packets may be switched between different LCCs and within the same LCC. The packet format is shown in Table 1.

Specifically, the packet switching process includes the following steps: The S0 receives a packet sent by the source LC, and determines whether the packet is directed to this chassis or any other chassis according to the destination LCC ID carried in the packet. If the packet is directed to this chassis, the S0 sends the packet to the destination LC according to the destination LC ID. If the packet is directed to another chassis, the S0 selects an S1 according a specific algorithm such as a load balancing algorithm, and sends the packet to the S1 in the FCC. According to the load balancing algorithm, the S1 selects an S2, and sends the packet to the S2. According to the destination LCC ID, the S2 selects the S3 coupled to the destination LCC, and sends the packet to the S3. If the S3 is coupled to more than one S0, the S3 may select an S0 according to a specific algorithm such as a load balancing algorithm, and send the packet to the foregoing S0 in the LCC. According to the ID of the destination LC, the S0 sends the packet to the destination LC.

Figure 9:
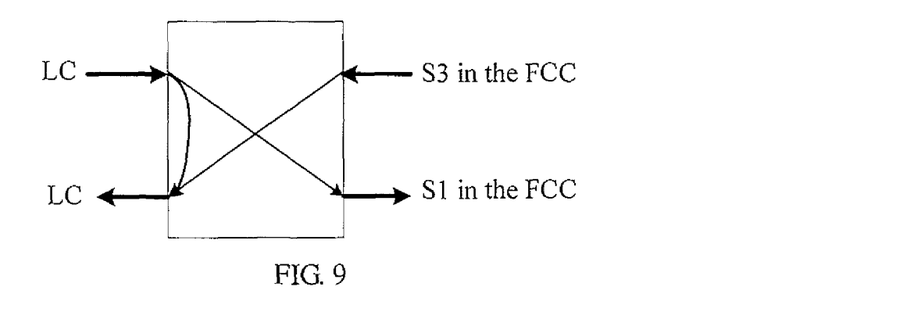
FIG. 9 shows a structure of an S0 according to the third embodiment of the present invention.

FIG. 9 shows a structure of an S0 in FIG. 8. No matter whether the S0 is applied to a single chassis or multiple interconnected chassis, local packet switching can be performed between the LCs in this chassis. As shown in FIG. 9, in the case that multiple chassis are interconnected, the S0 may send the packet in this chassis to the S1 in the FCC, and forward the packet from the S3 in the FCC to the LC in this chassis, and switch the packet between different LCs in this chassis.

Through this SF, the flow control information generated by the S3 may be quickly transmitted to the component required to respond to the flow control information. The component that responds to the flow control information may be the S2 or S1 or LC. The following description supposes that the S2 is the component that responds to the flow control information: When congestion occurs at the S3, and the S3 wants to notify the S2 to suspend the sending of packets, the S3 generates flow control information that includes an ID of the component required by the S3 to respond to the flow control information (namely, the ID of the S2) (the component that responds to the flow control information may be one or more S2s); the S3 sends the flow control information to the S1 corresponding to the S3. It should be noted that the S3 and the corresponding S1 may be located on the same physical component or different physical components, and may be connected through a dedicated interface. According to the S2 ID carried in the flow control information, the S1 sends the flow control information to the S2. After receiving the flow control information, the S2 knows that congestion occurs at the S3 and suspends the sending of packets to the S3. The flow control information needs to be transmitted only in this FCC, and does not need to be transmitted to the LCC through fibers as in the prior art. Therefore, the flow control information generated by the S3 can be transmitted to the S2 in time, and the S2 can respond to the flow control information in time.

In the following description, the LC is a component that responds to the flow control information sent by the S3: When congestion occurs at the S3, and the S3 wants to notify the LC to suspend the sending of packets, the S3 generates flow control information. The flow control information includes: an ID of the component required by the S3 to respond to the flow control information (namely, the ID of the LC) and the ID of the LCC that includes the LC; the S3 sends the flow control information to the S1 corresponding to the S3; according to an algorithm such as a load balancing algorithm, the S1 selects one or more S2s, and sends the flow control information to the S2; the S2 determines the S3 coupled to the LCC according to the ID of the LCC, and sends the flow control information to the S3; the S3 sends the flow control information to the S0 coupled to the S3, and the S0 sends the flow control information to the LC according to the ID of the LC. The S3 may also determine the LC that responds to the flow control information according to the ID of the LC, and notify the S0 to send the flow control information to the LC. In this case, as an RPT, the S0 serves the purpose of only forwarding the flow control information. In the transmission process of the flow control information, the flow control information passes through the fibers only once. In contrast, in the prior art, the flow control information passes through the fibers twice. Therefore, in the solution disclosed herein, the flow control information generated by the S3 can be transmitted to the LC in time.

The flow control information generated by the S2 can be quickly transmitted to the component that responds to the flow control information, for example, transmitted to the S1 or the LC. The following description supposes that the component that responds to the flow control information is the S1: When congestion occurs at the S2, and the S2 wants to notify the S1 to suspend the sending of packets, the S2 generates flow control information, and the flow control information includes an ID of the S1 required by the S2 to respond to the flow control information; the S2 sends the flow control information to the S3 corresponding to the S1; the S3 sends the flow control information to the S1 according to the ID of the S1 in the flow control information; after receiving the flow control information, the S1 knows the congestion at the S2, and suspends the sending of packets to the S2. The flow control information needs to be transmitted only in this FCC, and does not need to be transmitted to the LCC through fibers as in the prior art. Therefore, the flow control information generated by the S2 can be transmitted to the S1 in time, and the S1 can respond to the flow control information in time.

It should be noted that the mapping relations between components that generate and respond to the flow control information are not limited to the correspondence shown in the three scenarios above. Other modes of generating and responding to the flow control information are also applicable to the technical solution provided herein.

In the SF provided in the third embodiment, the S1, S2, and S3 are all located in the FCC. Therefore, the flow control information generated by the S3 can be transmitted to the S2 in time, the flow control information generated by the S2 can be transmitted to the S1 in time, and the flow control information can be responded to in time. Further, because the S0 exists in the FCC, packets can be switched between LCs in the chassis. Moreover, because the packets are switched in the LCC, the packet switching delay in the LCC is reduced, the traffic sent to the FCC is reduced, and the probability of FCC congestion is reduced. Besides, fewer fibers are used for connection between the S0 and the S1/S3, fewer fibers are required for interconnection between the LCC and the FCC, and the costs are reduced; further, in the case of interconnection between the LCC and the FCC, the configuration of the switch elements in the LCC is still the configuration of the S0, without the need of changing the S0 to the S1/S3. Therefore, the system can be upgraded by communicating the existing LCC with the FCC directly, without changing the existing LCC.

Fourth Embodiment

Figure 10:
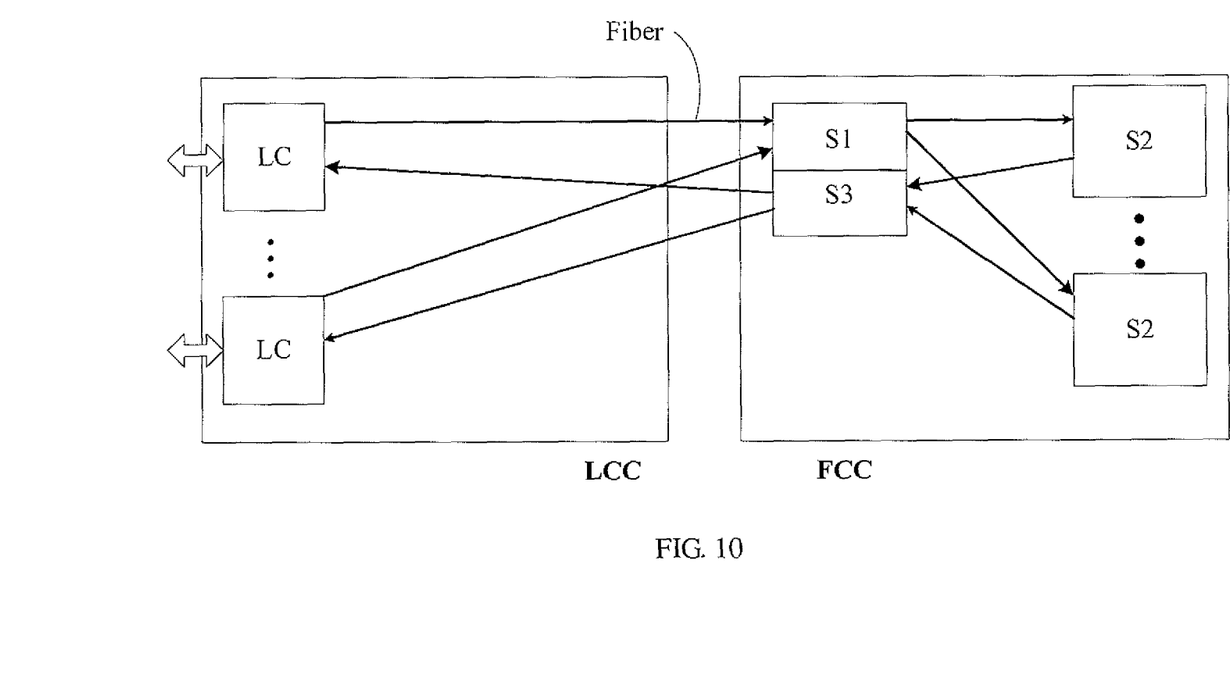
FIG. 10 shows a structure of a multi-stage SF according to a fourth embodiment of the present invention.

As shown in FIG. 10, a multi-stage SF is provided in the fourth embodiment of the present invention. The multi-stage SF includes at least one FCC, and one or more LCCs.

The FCC includes an S1, an S2, and an S3, where the S3 corresponds to the S1, and the S2 is coupled to the S1 and S3 respectively.

The LCC includes an LC coupled to the S1 and S3 in the FCC respectively. More specifically, the LC is connected to the S1 and S3 in the FCC respectively through signal cables.

The process of switching a packet between different LCs includes the following steps: The packet sent by the source LC is transmitted to the S1 in the FCC through a fiber; according to a certain algorithm such as a load balancing algorithm, the S1 selects an S2, and sends the packet to the S2; according to the destination LCC ID, the S2 selects the S3 coupled to the destination LCC, and sends the packet to the S3; according to the destination LC ID in the packet, the S3 sends the packet through a fiber to the destination LC in the LCC.

The process of generating and transmitting the flow control information is similar to that in the second embodiment, and is not described further.

In the SF provided in the fourth embodiment, the S1, S2, and S3 are all located in the FCC. Therefore, the flow control information generated by the S3 can be transmitted to the S2 in time, the flow control information generated by the S2 can be transmitted to the S1 in time, and the flow control information can be responded to in time.

Fifth Embodiment

Figure 11:
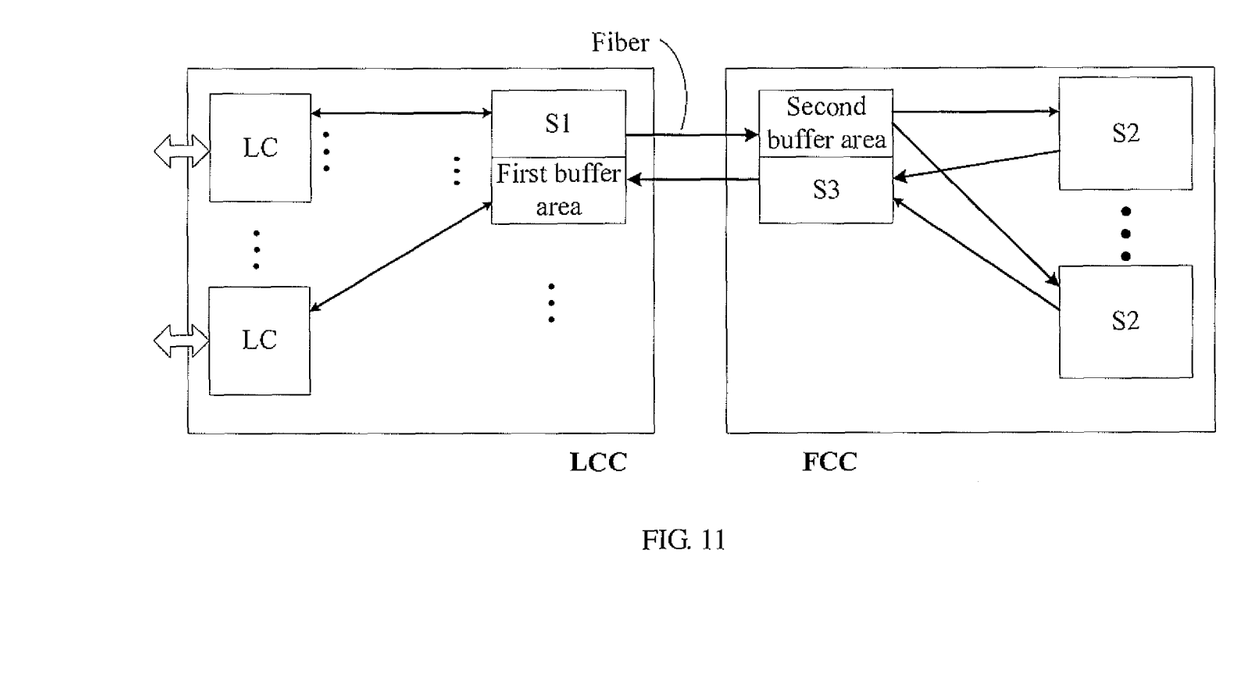
FIG. 11 shows a structure of a multi-stage SF according to a fifth embodiment of the present invention.

As shown in FIG. 11, a multi-stage SF is provided in the fifth embodiment of the present invention. The multi-stage SF includes at least one FCC, and one or more LCCs.

The LCC includes: an S1, a first buffer area bound to the S1, and an LC; and the FCC includes: an S3, a second buffer area bound to the S3, and an S2. The S1 corresponds to the S3 (namely, the S1 is logically connected to the S3), but the S1 is located in the LCC and the S3 is located in the FCC.

Through this SF, data flows can be switched between different LCs. The format of a data flow is shown in Table 1.

The packet switching process includes the following steps: The S1 receives a packet sent by a source LC; according to an algorithm such as a load balancing algorithm, the S1 selects an S2, and sends the packet to the second buffer area bound to the S3 corresponding to the S1, and the second buffer area sends the packet to the S2; according to the destination LCC ID, the S2 determines the S3 coupled to the destination LCC, and sends the packet to the S3; through a fiber, the S3 sends the packet to the first buffer area bound to the S1 corresponding to the S3; and the first buffer area sends the packet to the destination LC according to the destination LC ID.

Through this SF, the flow control information fed back by the S2 to the S1 is responded to in time, the flow control information fed back by the LC to the S3 is responded to in time, and the flow control information fed back by the S3 to the S2 is responded to in time.

Specifically, the process of transmitting the flow control information generated by the S2 includes the following steps: When congestion occurs at the S2, and the 52 needs to notify the S1 to suspend the sending of data flows, the S2 generates flow control information that includes an ID of the component required by the S2 to respond to the flow control information (namely, the ID of the S1). The S2 transmits the flow control information to the S3 corresponding to the S1. According to the flow control information, the S3 knows that the S2 wants to notify the S1 to suspend the sending of packets, notifies the second buffer area bound to the S3 to buffer the packets from the S1, and sends the flow control information to the first buffer area bound to the S1. The first buffer area transmits the flow control information to the S1. After receiving the flow control information, the S1 knows congestion at the S2, and suspends the sending of packets to the S2. After receiving the flow control information sent by the S2, the S3 notifies the second buffer area bound to the S3 to buffer the data flows from the S1, and suspends the sending of packets to the S2, thus relieving congestion on the S2.

Specifically, the process of transmitting the flow control information generated by the LC includes the followings steps: Congestion occurs at the LC, and the LC wants to notify the S3 to suspend the sending of packets. The LC generates flow control information that carries an ID of the component required by the LC to respond to the flow control information (namely, the ID of the S3). The flow control information generated by the LC is sent to the S1 corresponding to the S3 (the S3 that the LC wants to control). According to the flow control information, the S1 knows that the LC wants to notify the S3 to suspend the sending of packets, notifies the first buffer area bound to the S1 to buffer the packets from the S3, and sends the flow control information to the second buffer area bound to the S3. The second buffer area sends the flow control information to the S3. After receiving the flow control information, the S3 knows congestion at the LC, and suspends the sending of packets to the LC. After receiving the flow control information, the S1 notifies the first buffer area bound to the S1 to buffer the packets from the S3, and suspends the sending of packets to the LC, thus relieving congestion on the LC.

Specifically, the process of transmitting the flow control information generated by the S3 includes the following steps: The flow control information generated by the S3 is transmitted to the second buffer area bound to the S3, and the second buffer area sends the flow control information to the S2 according to the ID of the S2 required by the S3 to respond to the flow control information, where the ID is carried in the flow control information. After receiving the flow control information, the S2 knows congestion at the S3, and suspends the sending of packets to the S3. The flow control information is transmitted only in the FCC, and is transmitted to the S2 quickly so that the congestion at the S3 is solved in time.

It should be noted that the mapping relations between components that generate and respond to the flow control information are not limited to the correspondence shown in the three scenarios above. Other modes of generating and responding to the flow control information are also applicable to the technical solution provided herein.

In the SF provided in the fifth embodiment, the S1 and the first buffer area bound to the S1 are located in the LCC, and the S3 and the second buffer area bound to the S3 are located in the LCC. Therefore, after receiving the flow control information sent by the S2, the S3 notifies the second buffer area to buffer data flows from the S1, and suspends the sending of data flows to the S2, which relieves congestion at the S2; after receiving the flow control information, the S1 notifies the first buffer area to buffer packets from the S3, and suspends the sending of packets to the LC, which relieves congestion at the LC. Further, fewer fibers are used to couple the LCC to the FCC, thus reducing the fibers for interconnection between the LCC and the FCC and reducing the costs.

Moreover, the first buffer area or the second buffer area may be replaced with the RPT or another processing logical unit as required. If it is replaced with the RPT, the process of transmitting the flow control information generated by the S3 is the same as the process of the second buffer area, and is not described further.

Sixth Embodiment

Figure 12:
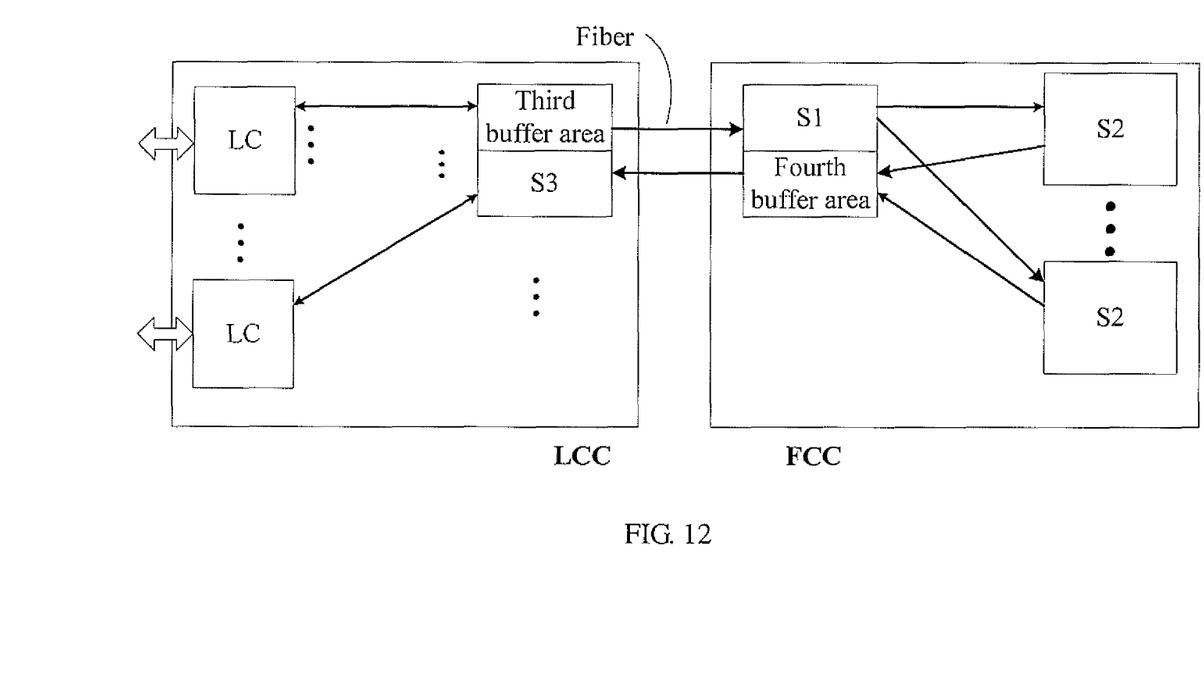
FIG. 12 shows a structure of a multi-stage SF according to a sixth embodiment of the present invention.

As shown in FIG. 12, a multi-stage SF is provided in the sixth embodiment. The SF includes one FCC and one or more LCCs.

The LCC includes: an S3, a third buffer area bound to the S3, and an LC; and the FCC includes: an S1, a fourth buffer area bound to the S1, and an S2. The S1 corresponds to the S3 (namely, the S1 is logically connected to the S3), but the S1 is located in the FCC and the S3 is located in the LCC.

Through this SF, packets can be switched between different LCs. The packet format is shown in Table 1.

The packet switching process includes the following steps: The source LC sends a packet to the third buffer area; the third buffer area sends the packet to the S1 through a fiber; the S1 selects an S2 according to a load balancing algorithm, and sends the packet to the S2; according to the destination LCC ID, the S2 determines the S3 that receives the packet in the destination LCC; according to the mapping relation between the S3 and the S1, the S2 sends the packet to the fourth buffer area bound to the corresponding S1; the fourth buffer area sends the packet to the S3; and the S3 sends the packet to the destination LC according to the destination LC ID.

Through the SF, when the bandwidth of the inter-chassis interconnection fiber converges, the buffer area can store packets temporarily. Specifically, because the bandwidth from the third buffer area to the S1 is less than the bandwidth from any LC in the LCC to the third buffer area, when the burst traffic of an LC in the LCC exceeds the bandwidth of the interconnection fiber, the third buffer area may buffer the received packet, and send flow control information to the LC in this chassis when necessary. Likewise, the fourth buffer area provides such functions as buffer packets, and is not detailed further.

Persons of ordinary skill in the art may understand that all or part of the steps of the method according to the embodiments of the present invention may be implemented by a program instructing relevant hardware. The program may be stored in a computer readable storage medium, such as a read-only memory (ROM), a magnetic disk or a compact disk read-only memory (CD-ROM).

Detailed above is a multi-stage SF provided in an embodiment of the present invention. Although the invention is described through several exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A multi-stage switch fabric (SF) comprising:
a fabric card chassis (FCC) comprising,
    a stage-1 switch element (S1),
    a first buffer area bound to S1,
    a stage-2 switch element (S2), and
    a stage-3 switch element (S3),
    a second buffer area bound to S3,
wherein the S3 corresponds to the S1, and the S2 is coupled to the S1 and S3 respectively;
a signal cable;
a line card chassis (LCC) comprising a line card (LC) and an interface coupled to the LC, the interface configured to receive packets from the LC and switch the received packets to the first buffer area via a first path of the signal cable, the interface configured to receive packets from the second buffer area via a second path of the signal cable and switch the received packets to the LC; and
wherein the interface comprises a stage-0 switch element (S0) configured to:
    switch packets from one LC in the LCC to another LC in the LCC, and
    switch packets from the LC in the LCC to the S1 in the FCC, and
    switch packets received from the S3 in the FCC to the LC in the LCC.

2. The multi-stage SF according to claim 1, wherein:
the S3 is configured to send generated flow control information to the S1 which is corresponding to the S3, wherein the flow control information carries an identifier (ID) of the LC required by the S3 to respond to the flow control information and an ID of the LCC that comprises the LC;
the S1 is configured to send the flow control information to the S2;
the S2 is configured to send the flow control information to the S3 coupled to the LCC according to the LCC ID carried in the flow control information;
the S3 coupled to the LCC is configured to send the flow control information to the S0 coupled to the S3; and
the S0 coupled to the S3 is configured to send the flow control information to the LC according to the LC ID carried in the flow control information.

3. The multi-stage SF according to claim 1, wherein:
the S3 is configured to send generated flow control information to the 51 corresponding to the S3, wherein the flow control information carries an identifier (ID) of the S2 required by the S3 to respond to the flow control information; and
the S1 is configured to send the flow control information to the S2 according to the ID of the S2 carried in the flow control information.

4. The multi-stage SF according to claim 1, wherein:
the S2 is configured to generate flow control information, and send the flow control information to the S3 corresponding to the S1 according to an identifier (ID) of the S1 required by the S2 to respond to the flow control information, wherein the ID of the S1 is carried in the flow control information; and the S3 is configured to send the flow control information to the S1 according to the ID of the S1 required by the S2 to respond to the flow control information, wherein the ID of the S1 is carried in the flow control information.

5. The multi-stage SF according to claim 1, wherein:

the S3 is configured to send generated flow control information to the S1 corresponding to the S3, wherein the flow control information carries an identifier (ID) of the LC required by the S3 to respond to the flow control information and an ID of the LCC that comprises the LC;

the S1 is configured to send the flow control information to the S2;

the S2 is configured to send the flow control information to the S3 connected to the LCC according to the ID of the LCC carried in the flow control information; and the S3 connected to the LCC is configured to send the flow control information to the LC through the interface component according to the ID of the LC carried in the flow control information.

\* \* \* \* \*